US012634116B2

(12) United States Patent
Ku et al.

(10) Patent No.: US 12,634,116 B2
(45) Date of Patent: May 19, 2026

(54) INFERENCE AND CONVERSION METHOD FOR ENCRYPTED DEEP NEURAL NETWORK MODEL

(71) Applicants:INVENTEC (PUDONG) TECHNOLOGY CORPORATION, Shanghai (CN); INVENTEC CORPORATION, Taipei City (TW)

(72) Inventors: Yu-Te Ku, Taipei City (TW); Chih-Fan Hsu, Taipei City (TW); Wei-Chao Chen, Taipei City (TW); Feng-Hao Liu, Taipei City (TW); Ming-Ching Chang, Taipei City (TW); Shih-Hao Hung, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 179 days.

(21) Appl. No.: 18/409,595

(22) Filed: Jan. 10, 2024

(65) Prior Publication Data
US 2025/0080320 A1 Mar. 6, 2025

(30) Foreign Application Priority Data
Aug. 30, 2023 (CN) .......................... 202311109960.7

(51) Int. Cl.
| | |
|---|---|
| *H04L 9/06* | (2006.01) |
| *G06N 3/0495* | (2023.01) |
| *H04L 9/00* | (2022.01) |

(52) U.S. Cl.
CPC ......... *H04L 9/0618* (2013.01); *G06N 3/0495* (2023.01); *H04L 9/008* (2013.01)

(58) Field of Classification Search
CPC ..... H04L 9/0618; H04L 9/008; G06N 3/0495; G06N 3/045; G06N 3/048; G06N 3/063; G06N 3/084; G06N 3/04; G06N 3/08; G06F 21/602
See application file for complete search history.

(56) References Cited

U.S. PATENT DOCUMENTS

| | | | | |
|---|---|---|---|---|
| 10,075,289 B2 * | 9/2018 | Laine | ........................ | G09C 1/00 |
| 11,188,817 B2 * | 11/2021 | Dikici | .................... | G06N 3/045 |
| 11,243,743 B2 * | 2/2022 | Johnson | ................ | G06F 7/4833 |
| 11,410,410 B2 * | 8/2022 | Ha | .......................... | G06N 3/048 |

(Continued)

OTHER PUBLICATIONS

Al Badawi, Ahmad, et al. "Privft: Private and fast text classification with homomorphic encryption." IEEE Access 8 (Dec. 2020) (Year: 2020).*

(Continued)

*Primary Examiner* — David Garcia Cervetti
(74) *Attorney, Agent, or Firm* — Maschoff Brennan

(57) ABSTRACT

An inference method for encrypted deep neural network model is executed by a computing device and includes: encoding a message according to a quantization parameter to generate a plaintext, encrypting the plaintext according to a private key to generate a ciphertext, sending the ciphertext to a deep neural network model to generate a ciphertext result, decrypting the ciphertext result according to the private key to generate a plaintext result, and decoding the plaintext result according to the quantization parameter to generate an inference result.

6 Claims, 8 Drawing Sheets

(56) References Cited

U.S. PATENT DOCUMENTS

| | | | |
|---|---|---|---|
| 11,430,124 B2* | 8/2022 | Li | G06N 3/0495 |
| 11,468,313 B1* | 10/2022 | Naumov | G06N 3/0495 |
| 11,475,352 B2* | 10/2022 | Zhang | G06N 5/04 |
| 11,481,608 B2* | 10/2022 | Ha | G06F 18/15 |
| 11,522,671 B2* | 12/2022 | Hiromasa | H04L 9/0618 |
| 12,001,577 B1* | 6/2024 | Xiong | G06N 3/04 |
| 12,061,988 B1* | 8/2024 | Sather | G06F 9/3455 |
| 12,106,209 B1* | 10/2024 | Kim | G06N 3/063 |
| 12,165,290 B1* | 12/2024 | Cheng | G06V 20/10 |
| 12,170,718 B2* | 12/2024 | Micciancio | H04L 9/008 |
| 12,238,199 B2* | 2/2025 | Cheng | H04L 9/008 |
| 12,307,217 B1* | 5/2025 | Dellinger | G06F 7/483 |
| 12,348,609 B2* | 7/2025 | Shin | H04L 9/008 |
| 12,399,713 B2* | 8/2025 | Bajic | G06F 7/5324 |
| 12,406,169 B2* | 9/2025 | Sakr | G06N 3/082 |
| 12,443,841 B2* | 10/2025 | Sun | G06N 3/063 |
| 12,450,490 B2* | 10/2025 | Kao | G06N 3/0495 |
| 12,475,388 B2* | 11/2025 | Yu | G06N 3/09 |
| 12,499,353 B1* | 12/2025 | Diamant | G06N 3/06 |
| 2017/0286830 A1* | 10/2017 | El-Yaniv | G06F 7/48 |
| 2018/0107451 A1* | 4/2018 | Harrer | G06F 7/483 |
| 2019/0188554 A1* | 6/2019 | Ma | G06N 3/063 |
| 2019/0311267 A1* | 10/2019 | Qin | G06N 3/084 |
| 2019/0318260 A1* | 10/2019 | Yasutomi | G06N 3/08 |
| 2019/0363871 A1* | 11/2019 | Cheon | H04L 9/304 |
| 2020/0019867 A1* | 1/2020 | Nandakumar | G06N 3/048 |
| 2020/0036510 A1* | 1/2020 | Gomez | G06N 3/08 |
| 2020/0104636 A1* | 4/2020 | Halevi | G06N 3/09 |
| 2020/0202213 A1* | 6/2020 | Darvish Rouhani | |
| | | | G06N 3/0442 |
| 2020/0252198 A1* | 8/2020 | Nandakumar | G06N 3/084 |
| 2020/0264876 A1* | 8/2020 | Lo | G06F 18/217 |
| 2020/0302295 A1* | 9/2020 | Tung | G06N 3/08 |
| 2020/0358611 A1* | 11/2020 | Hoang | G06N 3/045 |
| 2020/0364552 A1* | 11/2020 | Guo | G06N 3/09 |
| 2021/0110048 A1* | 4/2021 | Guo | H04L 9/0643 |
| 2021/0383237 A1* | 12/2021 | Tan | G06N 3/084 |
| 2022/0083855 A1* | 3/2022 | Choi | G06N 3/08 |
| 2022/0156982 A1* | 5/2022 | Idelbayev | G06N 3/0464 |
| 2022/0172052 A1* | 6/2022 | Bunandar | G06N 3/065 |
| 2022/0245447 A1* | 8/2022 | Liu | G06N 3/04 |
| 2022/0300784 A1* | 9/2022 | Kawabe | G06N 3/04 |
| 2022/0366223 A1* | 11/2022 | Fathallah-Shaykh | |
| | | | G06N 3/084 |
| 2023/0087864 A1* | 3/2023 | Cheng | H04L 9/0618 |
| | | | 380/28 |
| 2023/0153632 A1* | 5/2023 | Solinas | G06N 3/045 |
| | | | 706/15 |
| 2023/0237308 A1* | 7/2023 | Sakr | G06N 3/063 |
| | | | 706/25 |
| 2023/0325529 A1* | 10/2023 | Sav | G06N 3/045 |
| | | | 726/26 |
| 2023/0325658 A1* | 10/2023 | Chen | G06N 3/08 |
| | | | 706/17 |
| 2023/0327856 A1* | 10/2023 | Lu | H04L 9/0825 |
| | | | 713/171 |
| 2023/0368019 A1* | 11/2023 | Son | G06N 3/0455 |
| 2024/0062102 A1* | 2/2024 | Lal | H04L 9/008 |
| 2024/0070266 A1* | 2/2024 | Chai | G06F 21/14 |
| 2024/0126896 A1* | 4/2024 | Elfadel | G06F 21/602 |
| 2024/0195618 A1* | 6/2024 | Paul | H04L 9/008 |
| 2024/0211763 A1* | 6/2024 | Trusov | G06N 3/048 |
| 2024/0256850 A1* | 8/2024 | Soceanu | H04L 9/008 |
| 2024/0259181 A1* | 8/2024 | Chevallier-Mames | |
| | | | G06N 3/048 |
| 2024/0273218 A1* | 8/2024 | No | G06F 21/602 |
| 2024/0305785 A1* | 9/2024 | Van Rozendaal | H04N 19/137 |
| 2024/0347043 A1* | 10/2024 | Qiu | G10L 15/063 |
| 2025/0005200 A1* | 1/2025 | Javaheripi | G06F 21/6245 |
| 2025/0029489 A1* | 1/2025 | Cao | G08G 1/0133 |
| 2025/0030536 A1* | 1/2025 | Soriente | G06F 7/544 |
| 2025/0045589 A1* | 2/2025 | Rengasamy | G06N 3/045 |
| 2025/0055671 A1* | 2/2025 | Soriente | H04L 9/008 |
| 2025/0077861 A1* | 3/2025 | Shen | G06N 3/0495 |
| 2025/0080768 A1* | 3/2025 | Filippov | H04N 19/42 |
| 2025/0131339 A1* | 4/2025 | Anghel | G06N 5/04 |
| 2025/0158802 A1* | 5/2025 | Lam | G06N 3/048 |
| 2025/0167979 A1* | 5/2025 | Nanjo | H04L 9/0618 |
| 2025/0184116 A1* | 6/2025 | Moon | H04L 9/008 |
| 2025/0200348 A1* | 6/2025 | Lin | G06N 3/082 |
| 2025/0217654 A1* | 7/2025 | Jin | H04L 9/008 |
| 2025/0272551 A1* | 8/2025 | Knoops | G06N 3/0495 |

OTHER PUBLICATIONS

Nandakumar, Karthik, et al. "Towards deep neural network training on encrypted data." Proceedings of the IEEE/CVF conference on computer vision and pattern recognition workshops. 2019. (Year: 2019).*

Liu, Zeyu, Daniele Micciancio, and Yuriy Polyakov. "Large-precision homomorphic sign evaluation using FHEW/TFHE bootstrapping." International Conference on the Theory and Application of Cryptology and Information Security. Cham: Springer Nature Switzerland, 2022. (Year: 2022).*

Legiest, Wouter, et al. "Neural network quantisation for faster homomorphic encryption." 2023 IEEE 29th International Symposium on On-Line Testing and Robust System Design (IOLTS). IEEE, 2023 (Year: 2023).*

Tayaranian, Mohammadreza, et al. "Towards fine-tuning pre-trained language models with integer forward and backward propagation." arXiv preprint arXiv:2209.09815 (Feb. 2023). (Year: 2023).*

Lou, Qian, and Lei Jiang. "She: A fast and accurate deep neural network for encrypted data." Advances in neural information processing systems 32 (2019). (Year: 2019).*

Chen, Hao, et al. "Efficient multi-key homomorphic encryption with packed ciphertexts with application to oblivious neural network inference." Proceedings of the 2019 ACM SIGSAC conference on computer and communications security. Nov. 2019. (Year: 2019).*

Stoian, A., Frery, J., Bredehoft, R., Montero, L., Kherfallah, C., Chevallier-Mames, B. Deep Neural Networks for Encrypted Inference with TFHE. CSCML 2023. Lecture Notes in Computer Science, vol. 13914. Springer, Cham. Jun. 2023 (Year: 2023).*

* cited by examiner

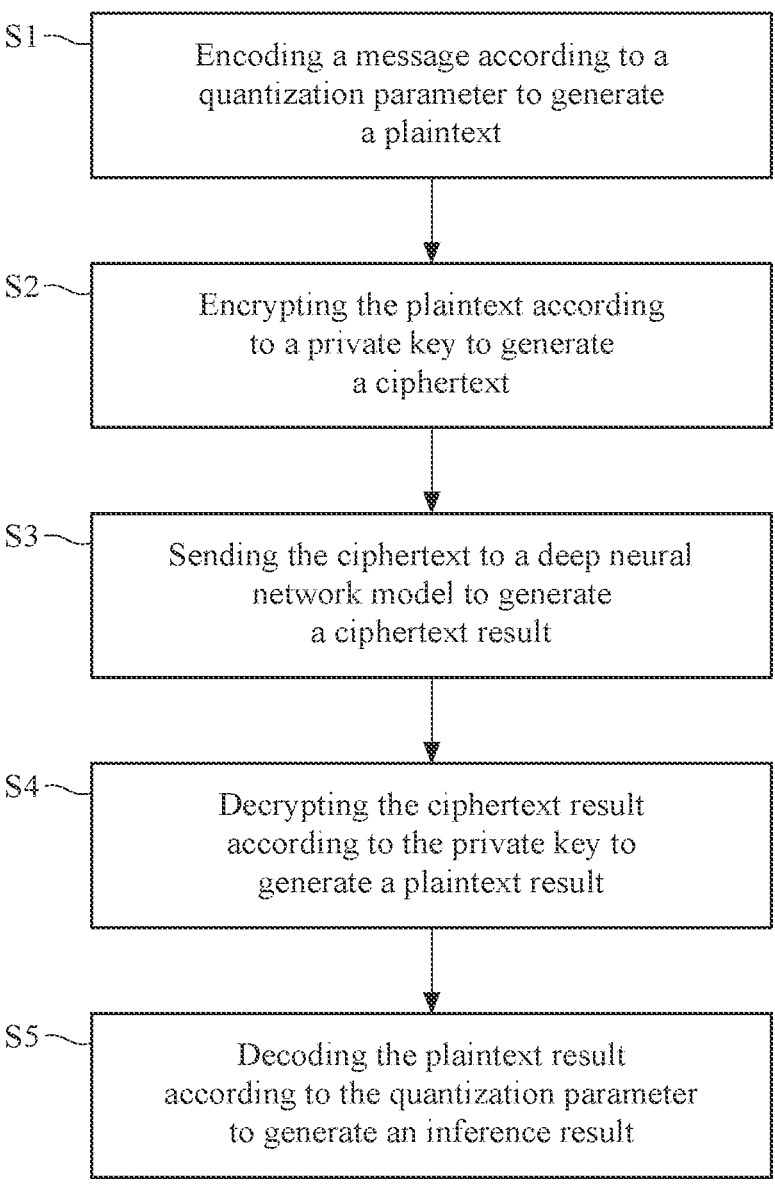

S1 — Encoding a message according to a quantization parameter to generate a plaintext S2 — Encrypting the plaintext according to a private key to generate a ciphertext S3 — Sending the ciphertext to a deep neural network model to generate a ciphertext result S4 — Decrypting the ciphertext result according to the private key to generate a plaintext result S5 — Decoding the plaintext result according to the quantization parameter to generate an inference result

FIG. 1B

T1 — Encoding a message according to a default value of a quantization parameter to generate an encoding result.

T2 — Calculating an inner product result according to the encoding result and a weight of a deep neural network model T3 — Generating the quantization parameters according to a size of the plaintext message space and the inner product result S31 — Calculating an encrypted inner product result according to the ciphertext and the model weight S32 — Reducing a first modulus of the encrypted inner product result to a second modulus to generate a modulus switch result.

S33 — Inputting the modulus switch result into an activation function to generate the ciphertext result.

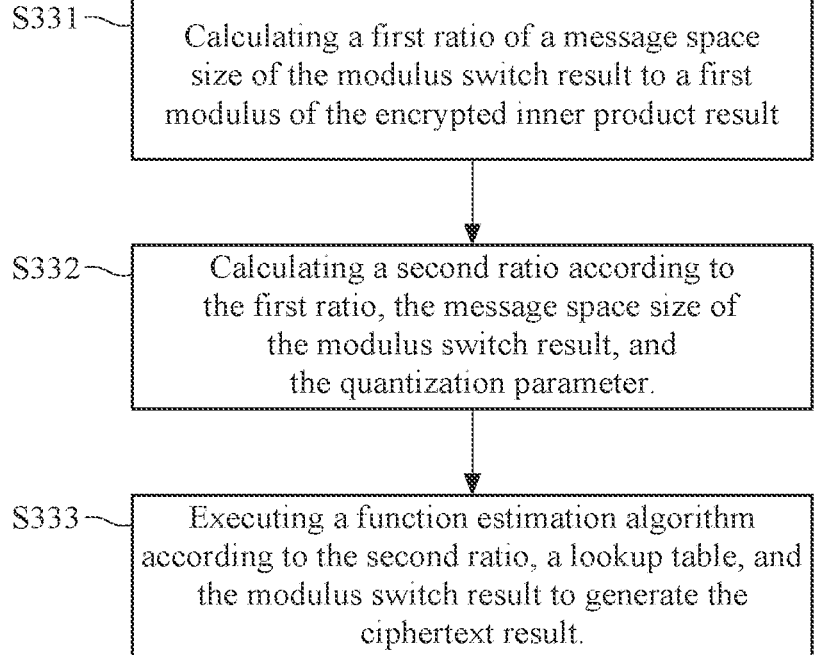

S331 — Calculating a first ratio of a message space size of the modulus switch result to a first modulus of the encrypted inner product result S332 — Calculating a second ratio according to the first ratio, the message space size of the modulus switch result, and the quantization parameter.

S333 — Executing a function estimation algorithm according to the second ratio, a lookup table, and the modulus switch result to generate the ciphertext result.

FIG. 5

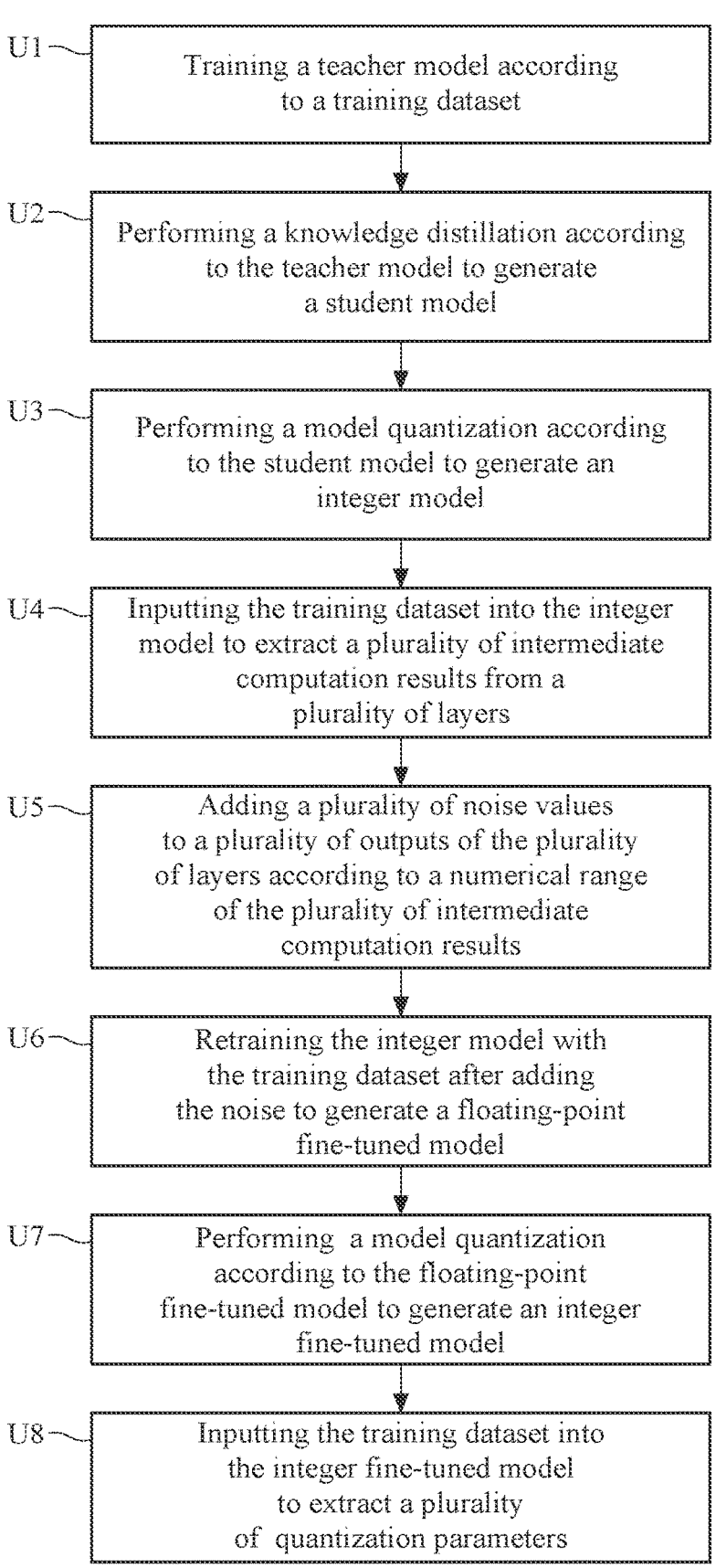

U1 — Training a teacher model according to a training dataset

U2 — Performing a knowledge distillation according to the teacher model to generate a student model U3 — Performing a model quantization according to the student model to generate an integer model U4 — Inputting the training dataset into the integer model to extract a plurality of intermediate computation results from a plurality of layers U5 — Adding a plurality of noise values to a plurality of outputs of the plurality of layers according to a numerical range of the plurality of intermediate computation results U6 — Retraining the integer model with the training dataset after adding the noise to generate a floating-point fine-tuned model U7 — Performing a model quantization according to the floating-point fine-tuned model to generate an integer fine-tuned model U8 — Inputting the training dataset into the integer fine-tuned model to extract a plurality of quantization parameters

FIG. 6

INFERENCE AND CONVERSION METHOD FOR ENCRYPTED DEEP NEURAL NETWORK MODEL

CROSS-REFERENCE TO RELATED APPLICATIONS

This non-provisional application claims priority under 35 U.S.C. § 119 (a) on Patent Application No(s). 202311109960.7 filed in China on Aug. 30, 2023, the entire contents of which are hereby incorporated by reference.

BACKGROUND

1. Technical Field

The present disclosure relates to Deep Neural Network (DNN) and homomorphic encryption, and more particular to an inference and conversion method for encrypted DNN model.

2. Related Art

With the recent advance of Artificial Intelligence (AI) and Deep Learning (DL), Deep Neural Network (DNN) models have gained significant attention due to their remarkable success across various fields, including robotics, natural language processing, healthcare, and computer vision. On the other hand, Machine Learning as-a-Service (MLaaS) offers a cloud-based platform for seamless integration and deployment of DNN models. However, the adoption of MLaaS brings forth additional challenges concerning data security and privacy. Data owners may concern about the safety and privacy of their data on the MLaaS platform, while model owners may concern regarding the leaking of their DL models or vulnerability to adversarial attacks. In fact, certain technical companies have implemented policies to prohibit the use of public MLaaS platforms for business data to prevent potential data leakage. Resolving the challenge of balancing utility and security in MLaaS is an urgent research inquiry that necessitates prompt attention and resolution.

Fully Homomorphic Encryption (FHE) is a groundbreaking concept that allows computations to be performed directly on encrypted data. The integration of FHE with MLaaS gives rise to an innovative opportunity of encrypted MLaaS that can push forward many frontiers of AI. In the encrypted MLaaS process, the users encrypt their private data transmitting them to the cloud server. The server then performs homomorphic computation of the ML model inference on the encrypted data, and then returns the encrypted results to the user. The users can then decrypt the results and retrieve the MLaaS outcome. Such utilization of FHE guarantees semantic security, effectively preventing the ML server from acquiring any knowledge about the user's input.

The main bottleneck of integrating FHE with DNN models is at the substantial overhead of encrypted computations. Specifically, computations that cannot be substituted or approximated by polynomial calculations are the primary obstacles. Computation operations in DNNs can generally be categorized into linear and non-linear operations. Linear operations including convolutional and Fully Connected layers have been extensively explored in the context of FHE, with relatively low computational costs. However, non-linear operations such as the Rectified Linear Unit (ReLU) or Sigmoid activation functions pose significant challenges in FHE. This holds true for methods employing the CKKS crypto scheme via polynomial approximation of activation functions, as well as the other approaches using the FHEW/TFHE scheme via functional bootstrapping. Despite substantial progress in recent FHE development, homomorphic computation on DNNs still requires significant computation time and resources, making the FHE-based DNN model impractical for real-world applications.

While the FHE-based DNN encrypted computation holds significant promise, current approaches are still far from practical implementations for real-world use. The question of effectively leveraging FHE schemes to DNNs, achieving both low computational cost and high accuracy, remains an open unsolved challenge.

SUMMARY

In light of the above descriptions, the present disclosure provides an inference and conversion method for encrypted deep neural network model.

According to one or more embodiment of the present disclosure, an inference method for encrypted deep neural network model executing by a computing device includes: encoding a message according to a quantization parameter to generate a plaintext; encrypting the plaintext according to a private key to generate a ciphertext; sending the ciphertext to a deep neural network model to generate a ciphertext result; decrypting the ciphertext result according to the private key to generate a plaintext result; and decoding the plaintext result according to the quantization parameter to generate an inference result.

According to one or more embodiment of the present disclosure, a conversion method for encrypted deep neural network model includes: inputting a training dataset into an integer model to extract a plurality of intermediate computation results from a plurality of layers; adding a plurality of noise values to a plurality of outputs of the plurality of layers according to a numerical range of the plurality of intermediate computation results; after the plurality of noise values is added to the integer model, retraining the integer model with the training dataset to generate a floating-point fine-tuned model; performing a model quantization according to the floating-point fine-tuned model to generate an integer fine-tuned model; and inputting the training dataset into the integer fine-tuned model to extract a plurality of quantization parameters, wherein the plurality of quantization parameters is configured to control a plurality of output values of a plurality of activation functions of the integer fine-tuned model.

The aforementioned context of the present disclosure and the detailed description given herein below are used to demonstrate and explain the concept and the spirit of the present application and provides the further explanation of the claim of the present application.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 1B is a flowchart illustrating an inference method for encrypted DNN according to an embodiment of the present disclosure

FIG. 5 is an internal operation flowchart of an activation function according to an embodiment of the present disclosure;

FIG. 6 is a flowchart illustrating the process of a conversion method for an encrypted DNN model according to an embodiment of the present disclosure.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1A:
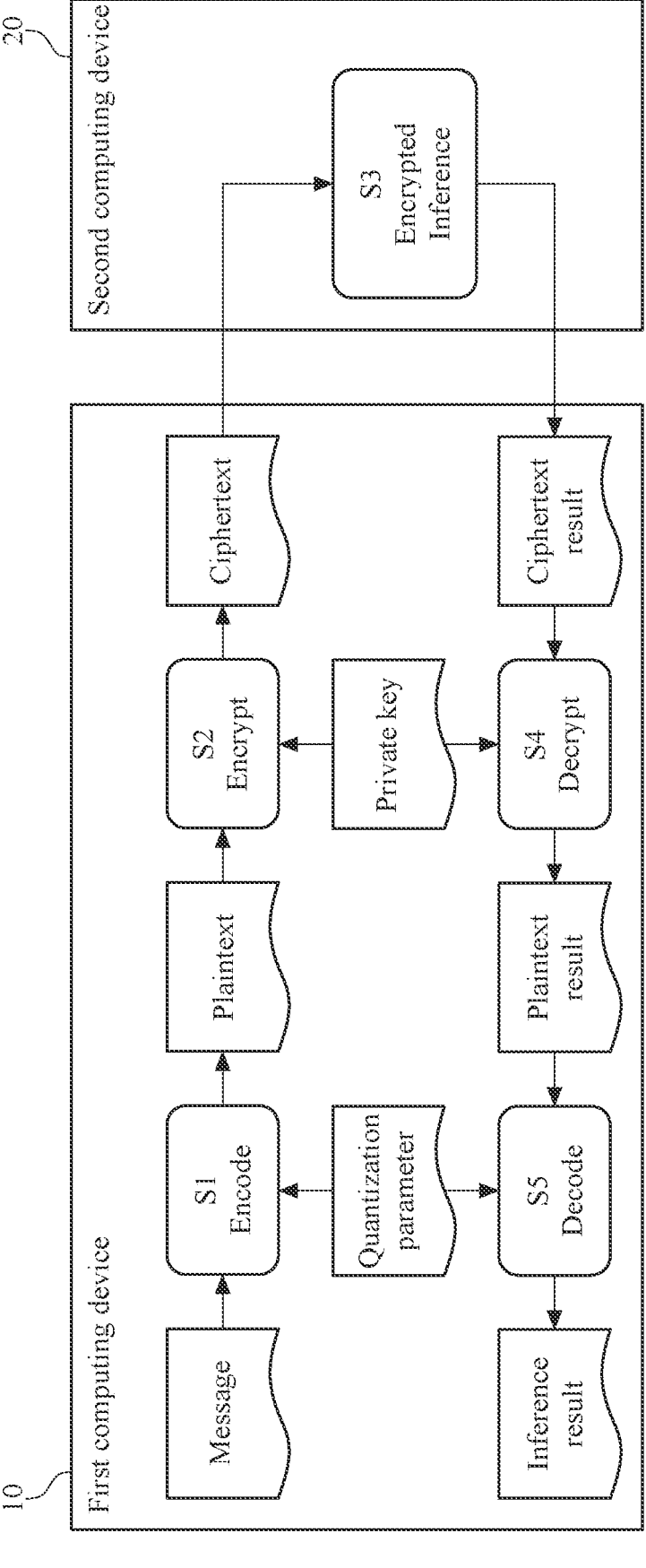
FIG. 1A is a schematic diagram of an inference system for encrypted inference neural network according to an embodiment of the present disclosure.

FIG. 1A is a schematic diagram of an inference system for encrypted inference neural network according to an embodiment of the present disclosure. The inference system includes a first computing device 10 for data owners and a second computing device 20 for model owners, with both devices communicatively connected to each other.

In an embodiment, the first computing device 10 and the second computing device 20 can be implemented by one or more of the following examples: personal computers, network servers, microcontrollers (MCUs), application processors (APs), field programmable gate arrays (FPGAs), Application Specific Integrated Circuits (ASICs), system-on-a-chip (SOC), deep learning accelerators, or any electronic devices with similar functionalities. The present disclosure does not limit the hardware types of the first computing device 10 and the second computing device 20.

FIG. 1B is a flowchart illustrating an inference method for encrypted deep neural network (DNN) according to an embodiment of the present disclosure. The inference method is applicable to the inference system shown in FIG. 1A.

Step S1, the first computing device 10 encodes a message according to a quantization parameter to generate a plaintext.

$$m = \text{Encode}(\text{Scale}_0,\, fp) = \lfloor fp \times \text{Scale}_0 \rfloor \qquad \text{(Equation 1)}$$

In an embodiment, the plaintext is generated as the above Equation 1.

The present disclosure utilizes the Learning with Errors (LWE) cryptosystem. Since LWE only supports the encryption and decryption of integers, an integer-type quantization parameter $\text{Scale}_0 \in \mathbb{Z}$ and an encoding function Encode $(\cdot)$ are used to convert a floating-point-type message fp $\in \mathbb{R}$ into an integer-type plaintext m $\in \mathbb{Z}_P$, where the modulus P represents the size of the plaintext message space. The generation of quantization parameters is described in detail later in the text.

Step S2, the first computing device 10 encrypts the plaintext according to a private key to generate a ciphertext.

$$s = \text{KeyGen}(\cdot) \qquad \text{(Equation 2)}$$

In an embodiment, the private key is generated as the above Equation 2. The KeyGen function of LWE is used to generate a public key (a, b) and a private key $$s \in \mathbb{Z}_Q^{n \times n},$$

where $$a \in \mathbb{Z}_Q^{n \times n}$$

is a random matrix, $$b = as + e \bmod Q,\, e \in \mathbb{Z}_Q^n$$

is an error vector, and Q $\in \mathbb{Z}$ is the modulus of the ciphertext.

$$ct^{P/Q} = \text{Encrypt}(s, P, Q, m) \qquad \text{(Equation 3)}$$

In an embodiment, the private key is generated as the above Equation 3. The input of the encryption function Encrypt $(\cdot)$ is an integer-type plaintext m $\in \mathbb{Z}$, and the private key s. The output is an LWE ciphertext $$ct^{P/Q} = (a, b) \in \mathbb{Z}_Q^{n+1}.$$

Step S3, the first computing device 10 sends the ciphertext to the second computing device 20, a DNN model running on the second computing device performs an encrypted inference to generate a ciphertext result, which are then returned to the first computing device 10. The DNN model employs a Fully Homomorphic Encryption (FHE) scheme and is a FHEW-variant DNN encrypted inference framework. Details about this model are discussed later in the text.

Step S4, the first computing device 10 receives the ciphertext result and decrypts it according to the private key to generate a plaintext result.

$$m = \text{Decrypt}\!\left(s, P, Q, ct^{P/Q}\right) \qquad \text{(Equation 4)}$$

In an embodiment, the plaintext result is generated as the above Equation 4. The input of the decryption function Decrypt $(\cdot)$ is the LWE ciphertext $ct^{P/Q}$ and the private key s. The output is an integer-type plaintext result m $\in \mathbb{Z}_P$.

Step S5, the first computing device 10 decodes the plaintext result according to the quantization parameter to generate an inference result.

$$fp = \text{Decode}(m, \text{Scale}_0) = \left| \frac{m}{\text{Scale}_0} \right| \quad \text{(Equation 5)}$$

In an embodiment, the inference result is generated as the above Equation 5. The input of the decode function Decode $(\cdot)$ is an integer-type plaintext result $m \in \mathbb{Z}_P$ and the quantization parameter $\text{Scale}_0 \in \mathbb{Z}$. The output is a floating-point-type inference result $fp \in \mathbb{R}$.

Figure 2:
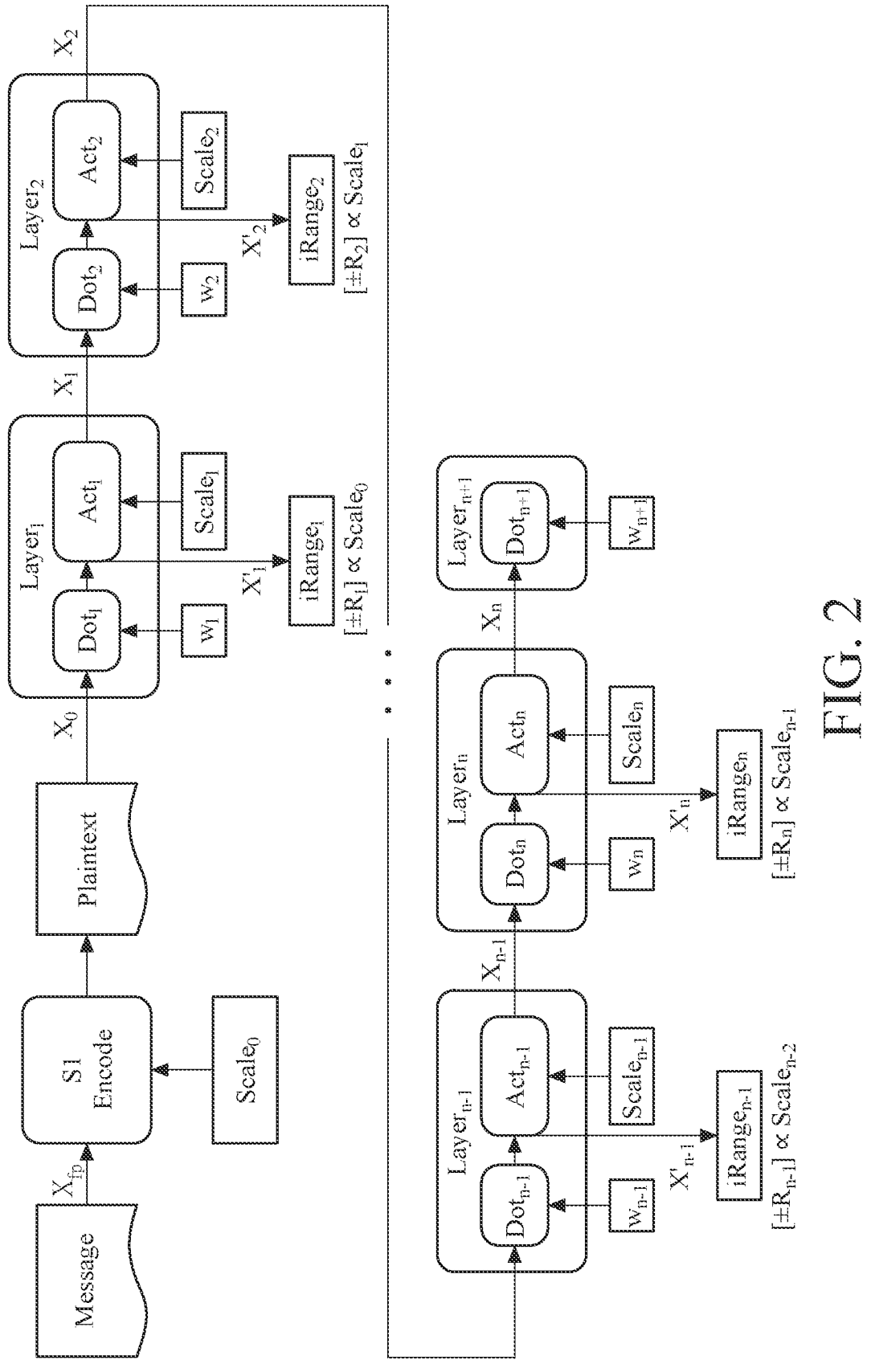
FIG. 2 is a schematic diagram of a DNN model and quantization parameters according to an embodiment of the present disclosure.

Before generating the plaintext in step S1 by encoding the message according to the quantization parameter, it is necessary to configure the quantization parameter. The following describes the method of generating the quantization parameter:

FIG. 2 is a schematic diagram of a DNN model (using the plaintext) and quantization parameters according to an embodiment of the present disclosure. As shown in FIG. 2, this model includes n+1 layers, $\text{Layer}_1$, $\text{Layer}_2$, . . . , $\text{Layer}_{n+1}$. Except for the last layer, $\text{Layer}_{n+1}$, which only performs the operation $\text{Dot}_{n+1}$, other layers, $\text{Layer}_i$, are composed of two operations: $\text{Dot}_i$ and $\text{Act}_i$, where i=1 . . . n. $\text{Dot}_i$ is used to calculate the dot product according to the model weights $W_i$ and the input data $X_{i-1}$. $\text{Act}_i$ represents the Rectified Linear Unit (ReLU) and scales the output range using the quantization parameter $\text{Scale}_i$. Equations 6 to 11 below provide the mathematical definition of the model M shown in FIG. 3.

$$M = \text{Layer}_1 \circ \ldots \circ \text{Layer}_n \circ \text{Dot}_{n+1} \quad \text{(Equation 6)}$$

$$\text{Layer}_i = \text{Dot}_i \circ \text{Act}_i \quad \text{(Equation 7)}$$

$$W_i \in \{w_1, w_2, w_3, \ldots, w_k\}, w_j \in \mathbb{Z}, j = 1, \ldots, k \quad \text{(Equation 8)}$$

$$X_{i-1} \in \{x_1, x_2, x_3, \ldots, x_k\}, x_j \in \mathbb{Z}, j = 1, \ldots, k \quad \text{(Equation 9)}$$

$$\text{Dot}_i(W_i, X_{i-1}) = \sum_{j=1}^{k} x_j \times w_j = x' \quad \text{(Equation 10)}$$

$$\text{Act}_i = \begin{cases} 0, & \text{if } x' \le 0 \\ (x' \times \text{scale}_i)/P, & \text{if } x' > 0 \end{cases} \quad \text{(Equation 11)}$$

Figure 3:
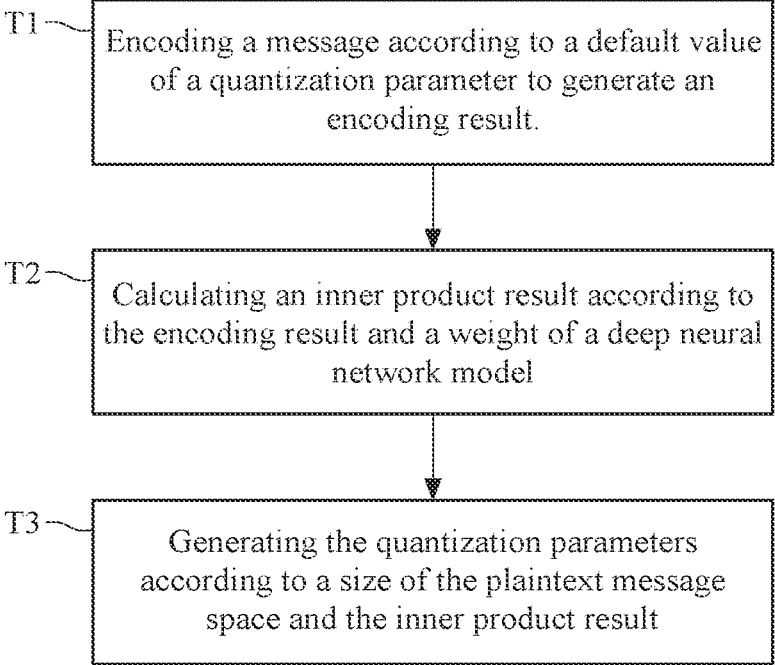
FIG. 3 is a flowchart illustrating the process of generating quantization parameters according to an embodiment of the present disclosure.

FIG. 3 is a flowchart illustrating the process of generating quantization parameters according to an embodiment of the present disclosure. Table 1 is an algorithm for generating quantization parameters. FIG. 3 includes three steps: Step T1, encoding the message according to a default value of the quantization parameter to generate an encoding result (corresponding to algorithm lines 02, 06, and 13). Step T2, calculating an inner product result according to the encoding result and a weight of the DNN model (corresponding to algorithm lines 03, 09, and 16). Step T3, generating the quantization parameter according to a size of plaintext message space and the inner product result (corresponding to algorithm lines 04, 10, and 17).

TABLE 1

Algorithm for generating the quantization parameter.

| EstimateQtzParams(Model, $X_{fp}$) $\rightarrow$ Scale$^{n+1}$ |
|---|
| 01      scale$_0$ = 128 |
| 02      $X_0$ = Encode(scale$_0$, $X_{fp}$) |
| 03      iRange$_1$ = [±R$_1$] = Dot$_1$(X$_0$) |
| 04      scale$_0$ = $\frac{P}{2 \times R_1} \times 128$ |
| 05      set Sub Model($\cdot$) = Layer$_1$ $\circ$ Dot$_2$ |

TABLE 1-continued

Algorithm for generating the quantization parameter.

| 06      $X_0$ = Encode(scale$_0$, $X_{fp}$) |
|---|
| 07      scale$_1$ = 128 |
| 08      Scale$^1$ = [scale$_1$] |
| 09      iRange$_2$ = [±R$_2$] = SubModel(X$_0$, Scale$^1$) |
| 10      scale$_1$ = $\frac{P}{2 \times R_2} \times 128$ |
| 11      for i = 2 to (n − 1) do |
| 12         set SubModel($\cdot$) = Layer$_1$ $\circ$ ... $\circ$ Layer$_i$ $\circ$ Dot$_{i+1}$ |
| 13         $X_0$ = Encode(scale$_0$, $X_{fp}$) |
| 14         scale$_i$ = 128 |
| 15         Scale$^i$ = [scale$_1$, ... , scale$_i$] |
| 16         iRange$_{i+1}$ = [±R$_{i+1}$] = SubModel(X$_0$, Scale$^i$) |
| 17         scale$_i$ = $\frac{P}{2 \times R_{i+1}} \times 128$ |
| 18      end for |
| 19      Scale$^{n+1}$ = [scale$_0$, ... , scale$_{n+1}$] |
| 20      return(Scale$^{n+1}$) |

The details of Step S3, performing the encrypted inference to generate the ciphertext result by the DNN model, are described in the following.

Figure 4:
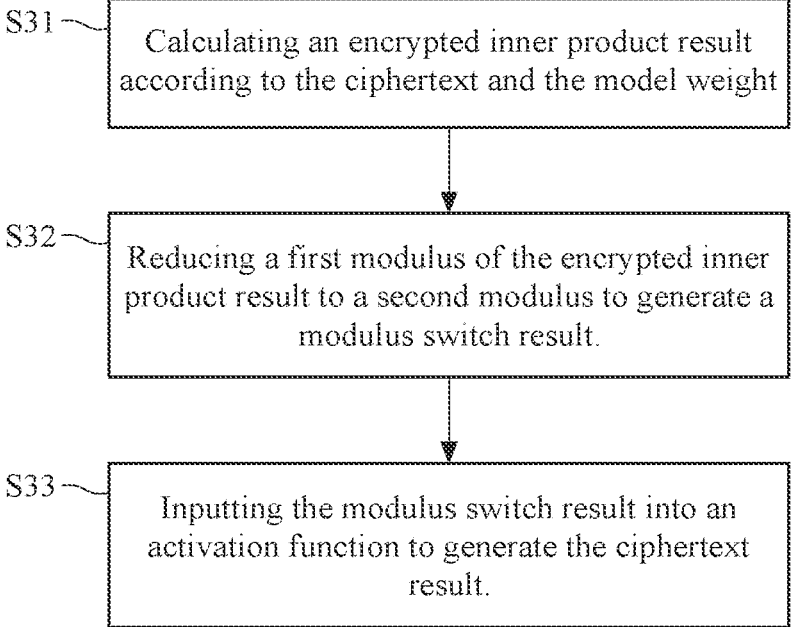
FIG. 4 is a flowchart illustrating the process of generating the ciphertext result by a DNN model according to an embodiment of the present disclosure

The DNN model includes a plurality of neurons. In the FHEW-variant DNN model proposed by the present disclosure, the internal operation process of each neuron during inference is illustrated in FIG. 4 and described in Table 2. FIG. 4 is a flowchart of generating the ciphertext result in the DNN model according to an embodiment of the present disclosure, while Table 2 shows the algorithm corresponding to the process shown in FIG. 4.

TABLE 2

Algorithm for the internal operation of FHEW-variant neurons.

| | FHENeuron(CT$^k_{P/Q_{in}}$, W$^k$, Scale) $\rightarrow$ ct$^{Pout/Q_{in}}$ |
|---|---|
| 01 | ct$^{P/Qin}$ = DotProduct(CT$^K_{P/Q_{in}}$, W$^k$) |
| 02 | ct$^{P/q}$ = ModSwitch(ct$^{P/Qin}$, q) |
| 03 | ct$^{Pout/Q_{in}}$ = ActFunBoot(f$_{ACT}$, Scale, ct$^{P/q}$) |
| 04 | return ct$^{Pout/Q_{in}}$ |

As shown in FIG. 4, in Step S31, the second computing device 20 calculates an encrypted inner product result according to the ciphertext and a model weight, corresponding to algorithm line 01. The inputs of the DotProduct function are a k-dimensional plaintext array $W^k$ (representing model weights) and a k-dimensional ciphertext array $$CT^k_{P/Q_{in}},$$

and the output is the encrypted inner product result of these two inputs.

In an embodiment, the DotProduct function includes two steps, scalar multiplication and homomorphic encryption addition, as shown in Equation 12 and Equation 13 below.

$$\text{ScaleMul}\left(ct_i^{P/Q}, w_i\right) = ct_i^{P/Q} \times w_i \quad \text{(Equation 12)}$$

$$\text{HEAdd}\left(ct_1^{P/Q}, ct_2^{P/Q}, \ldots, ct_k^{P/Q}\right) = \sum_{i=1}^{k} ct_{in}^{P/Q} \quad \text{(Equation 13)}$$

The scalar multiplication ScaleMul calculates a plurality of scalar products $$ct_i^{P/Q} \times w_i$$

according to a plurality of encrypted values contained in the ciphertext array $$CT_{P/Q_{in}}^k$$

and a plurality of scalar values contained in the model weights $W_k$, where $i=1, \ldots, k$.

The Homomorphic Encryption Addition (HEAdd) performs homomorphic encryption addition according to the plurality of scalar products $$ct_1^{P/Q}, ct_2^{P/Q}, \ldots, ct_k^{P/Q}$$

to generate the encrypted inner product result.

Step S32, the second computing device 20 reduces the first modulus of the encrypted inner product result to the second modulus to generate a modulus switch result, corresponding to algorithm line 02. The input of ModSwitch function is the encrypted inner product result $ct^{P/Q in}$ with the first modulus $Q_{in}$ and the output is the modulus switch result $ct^{P/q}$ with the second modulus q.

In Step S33, the modulus switch result is inputted into an activation function to generate the ciphertext result, corresponding to algorithm line 03. The present disclosure introduces an activation function ActFunBoot with functional bootstrapping to support encrypted computation of any non-linear function. In an embodiment, the non-linear function is ReLU. FIG. 5 is an internal operation flowchart of ActFunBoot according to an embodiment of the present disclosure. Table 3 is the algorithm corresponding to FIG. 5.

TABLE 3

| Algorithm of ActFunBoot. |
|---|
| $ActFunBoot\left(f_{ACT}, \text{Scale}, ct^{\frac{P}{q}}, Q_{in}\right) \rightarrow ct^{Pout/Qin}$ |
| 01    $\alpha = \dfrac{P}{Q_{in}}$ |
| 02    $\alpha' = \alpha \times \dfrac{P}{\text{Scale}}$ |
| 03    $ct^{Pout/Qin} = EvalFunc(ct^{P/q}, f_{ACT}, \alpha')$ |
| 04    return $ct^{Pout/Qin}$ |

Step S331, the second computing device 20 calculates the first ratio $\alpha$ of the message space size P of the modulus switch result $ct^{P/q}$ to the first modulus $Q_{in}$ of the encrypted inner product result $ct^{P/Qin}$, corresponding to algorithm line 01.

Step S332, the second computing device 20 calculates the second ratio $\alpha'$ according to the first ratio $\alpha$, the message space size P of the modulus switch result $ct^{P/q}$, and the quantization parameter Scale, corresponding to algorithm line 02.

Step S333, the second computing device 20 executes a function evaluation algorithm EvalFunc according to the second ratio $\alpha'$, a lookup table $f_{ACT}$, and the modulus switch result $ct^{P/q}$, to generate the ciphertext result. In an embodiment, the lookup table $f_{ACT}$ is used to map an input ciphertext to an output ciphertext to implement a nonlinear function, such as ReLU, while the second ratio $\alpha'$ is used to set the slope of ReLU.

The function evaluation algorithm EvalFunct $(\cdot)$ can eliminate the noise in the input ciphertext when performing an evaluation of a function. The input of EvalFunct $(\cdot)$ includes the ciphertext $$ct_{in}^{p/q},$$

an extraction function $f_{in}$, and an integer a representing the message space $P_{out} \in \mathbb{Z}$. The output is a denoised ciphertext $$ct_{out}^{P/Q}$$

that has been evaluated by $f_{in}$, as shown in Equation 14 below.

$$ct_{out}^{P/Q} = EvalFunct\left(ct_{in}^{p/q}, f_{in}, \alpha\right) \qquad \text{(Equation 14)}$$

Regarding the implementation of EvalFunct $(\cdot)$, please refer to the following literature: Z. Liu, D. Micciancio, and Y. Polyakov, "Large-precision homomorphic sign evaluation using FHEW/TFHE bootstrapping," in ASIACRYPT 2022, Part II, ser. LNCS, S. Agrawal and D. Lin, Eds., vol. 13792. Springer, Heidelberg, December 2022, pp. 130-160.

When the original FHEW scheme performs a bootstrapping operation, the modulus of the ciphertext is increased from q to Q, where Q>>q. As a result, a ModSwitch operation is necessary to reduce the modulus back to q, which restricts the size of message space. This limitation is precisely why the original FHEW scheme is inadequate for executing encrypted inference beyond Boolean operations. To adopt FHEW into a variant that fits the requirement of low-bit integer computation, the present disclosure has made modification to the original FHEW gate operation and developed a new architecture for the FHEW-variant DNN node, as shown in FIG. 4 and Table 2. A basic DNN node consists of two operations: a linear computation (such as a convolution or FC layer) followed by a non-linear activation. The encrypted linear-layer computation is achieved by performing a dot product between the ciphertext and the model weights. The present disclosure enables linear operations on the ciphertext using a larger modulus Q, resulting in accelerated DNN computations. Subsequently, the ciphertext obtained from the linear layer undergoes a conversion from modulus Q to q through a ModSwitch operation. It is then mapped through a lookup table $f_{ACT}$, and the ciphertext is bootstrapped to reduce noise.

The following describes how to build the FHEW-variant DNN model proposed in the present disclosure starting from the training dataset. FIG. 6 is a flowchart illustrating the process of a conversion method for an encrypted DNN model according to an embodiment of the present disclosure.

Step U1 and step U2, the second computing device 20 trains a teach model according to a training dataset and then performs a knowledge distillation according to the teacher model to generate a student model.

The application of homomorphic encryption may incur a considerable computational overhead, which necessitates a significant amount of computing resources and time. As such, it is imperative to explore techniques that compress or simplify DNN models, thereby facilitating execution in an encrypted environment. Knowledge distillation is a technique used to transfer knowledge from a large and complex model (known as the teacher model) to a smaller and simpler one (known as the student model). This technique aims to enhance the performance of the student model while reducing its computational requirements. In an embodiment, the knowledge-distillation-pytorch library is selected for implementation due to its simple and flexible features. This library includes support for various types of distillation methods, such as mean squared error and cross-entropy distillation, as well as different types of temperature scaling.

Step U3, the second computing device 20 performs a model quantization according to the student model to generate an integer model.

FHEW scheme can only encrypt and compute with integers, therefore it is necessary to convert DNN models from floating-point to integer format. Post-Training Quantization (PTQ) is a technique for converting the weights of a trained deep neural network model from floating-point to low-precision integers, such as 8-bit integers. PTQ is typically performed after the training of the deep neural network is completed. The quantization process converts the original floating-point weights and activation values to integers.

The present disclosure proposes a noise-aware fine-tuning method in the following steps U4-U8, thereby enhancing the resilience of the DNN to noise. This method is designed to mitigate the adverse effects of noise on the DNN's performance, thereby improving its accuracy and reliability. The current method adopts Gaussian noise injection to fine-tune a well-trained NN model for preventing overfitting. Fine-tuning the model with noise injection can smooth the decision boundary, then, finally prevent the overfitting problem. The present disclosure hypothesize that a smooth decision boundary can improve the model's robustness against the noise during computation. By assuming that the error generated by the FHEW scheme is a certain type of noise injection, the model can be fine-tuned to achieve error tolerance.

Step U4, inputting a training dataset into an integer model to extract a plurality of intermediate computation results from a plurality of layers. Step U5, adding a plurality of noise values to a plurality of outputs of the plurality of layers according to a numerical range of the plurality of intermediate computation results. Step U6, retraining the integer model with the training dataset to generate a floating-point fine-tuned model. Step U7, performing a model quantization according to the floating-point fine-tuned model to generate an integer fine-tuned model. Step U8, inputting the training dataset into the integer fine-tuned model to extract a plurality of quantization parameters, where the plurality of quantization parameters is configured to control a plurality of output values of a plurality of activation functions of the integer fine-tuned model.

Specifically, consider a L-layer neural network with the weights at each layer k (denoted $W_k$). When input data x are fed into the DNN, the output of the $k^{th}$ layer's activation is denoted as $h_k$, as shown in Equation 15 below.

$$h_k(x) = \varphi(W_k h_{k-1}(x)) \qquad \text{(Equation 15)}$$

where k=1, . . . , (L−1), and the numerical range of the intermediate computation results in layer k is $[-R_k, R_k]$.

After adding a noise with uniform distribution Ex with range $[-R_k, R_k]$ to each layer k, the output of the $k^{th}$ layer's activation is shown in Equation 16 below.

$$\hat{h}_k(x) = \varphi(W_k \hat{h}_{k-1}(x)) + \epsilon_k \qquad \text{(Equation 16)}$$

Figure 7:
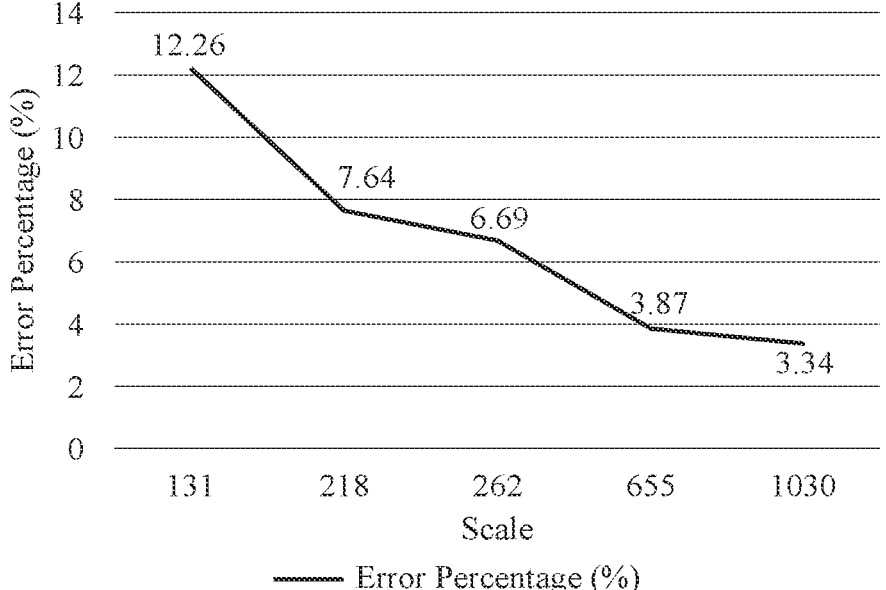
FIG. 7 is a schematic diagram illustrating the relationship between quantization parameter values and error percentages (noise levels) obtained from experiments.

Note here that the range of the uniform distribution $R_k$ at each layer k is different. $R_k$ is determined by selecting a suitable quantization parameter value with minimal noise level. FIG. 7 is a schematic diagram illustrating the relationship between quantization parameter values and error percentages (noise levels) obtained from experiments. The present disclosure carefully selects the quantization parameter value to make the noise added to each layer will resemble the distribution of noise generated by ActFunBoot during model fine-tuning. In an embodiment, the quantization parameter value corresponding to the minimum error percentage is chosen. Then, $R_k$ is calculated using Equation 17 below.

$$R_k = \varphi(W_k \hat{h}_{k-1}(x)) \cdot e_k \qquad \text{(Equation 17)}$$

where $e_k$ represents the error percentage generated by ActFunBoot in the $k^{th}$ layer. Then, based on $R_k$, the noise added at each layer during the fine-tuning process can be defined. By retraining the weights of the DNN model with the added noise, the robustness of the model can be enhanced.

In view of the above, the neuron of the DNN model proposed in the present disclosure consists of an encrypted dot product computation followed by a cost-effective, integer-based functional bootstrapping scheme named ActFunBoot. ActFunBoot supports encrypted computation of arbitrary nonlinear functions and facilitates fast scalar division on ciphertext. ActFunBoot allows for the adjustment of quantization parameters, enabling control over the scale and noise level of ciphertext outputs from the NN nodes.

The present disclosure proposes a conversion method for encrypted DNN model to address the numerical overflow and noise issues that arises during encrypted computations. The proposed method leverages fine-tuning of FHEW-variant DNN model and estimation of ActFunBoot quantization parameters to achieve a balance between the precision limitations in design selection and the computational accuracy necessary for implementing FHEW-variant DNNs. The proposed fine-tuning process involves three optimization aspects. (1) Using a suitable model distillation and quantization configuration to transform a pre-trained network into a smaller quantized network, and meet the requirements of FHEW-variant operations for speed up. (2) Estimating a suitable quantization setting for FHEW-variant DNN node design, which can effectively prevent numerical overflow and error accumulation. Finally, (3) The fine-tuning design is noise-aware, aiming to optimize the model weight parameters for FHEW-variant DNN, thereby further improving the overall accuracy of DNN inference.

Table 4 below compares the approach of the present disclosure with existing FHE methods (Q. Lou and L. Jiang, "SHE: A fast and accurate deep neural network for encrypted data," in Advances in Neural Information Processing Systems 32: Annual Conference on Neural Information Processing Systems 2019, NeurIPS 2019 December 8-14, 2019, Vancouver, BC, Canada, H. M. Wallach, H. Larochelle, A. Beygelzimer, F. d'Alch'e-Buc, E. B. Fox, and R. Garnett, Eds., 2019, pp. 10 035-10 043)

TABLE 4

| Comparison of 8-bit and 16-bit SHE with the present disclosure. | | | |
| --- | --- | --- | --- |
| | SHE (8-bit) | SHE (16-bit) | The present disclosure |
| HE DNN Accuracy | 82%+ | | 80% |
| HEADD number | | 4,683,190 | |
| ScaleMUL number | | 4,690,432 | |
| ReLU number | | 22,272 | |
| HEACCC run time (s) | 0.0468 | 0.0937 | $<<6.18279*10-6$ |
| ScaleMUL run time (s) | $6.25*10-9$ | $1.35*10-8$ | $\approx6.18279*10-6$ |
| ReLU run time (s) | 0.01575 | 0.0315 | 0.0275 |
| Total time (s) | 219,875+ | 439,750+ | 642 |

The data in Table 4 pertains to encrypted inferences of a 6-layer DNN on a 32×32×3 CIFAR-10 image, with the unit of execution time measured in seconds. From Table 4, it can be observed that the method of the present disclosure outperforms existing encryption inference methods in terms of efficiency. The total execution time of the present disclosure is only 642 seconds, while achieving an 80% test accuracy. Additionally, the runtime memory consumption is below 20 GB. It is worth noting that, in comparison to SHE, the execution time of the present disclosure is significantly reduced.

Although embodiments of the present application are disclosed as described above, they are not intended to limit the present application, and a person having ordinary skill in the art, without departing from the spirit and scope of the present application, can make some changes in the shape, structure, feature and spirit described in the scope of the present application. Therefore, the scope of the present application shall be determined by the scope of the claims.

What is claimed is:

1. An inference method for encrypted deep neural network model, executing by a first computing device and a second computing device communicatively connected to the first computing device, comprising:

encoding, by the first computing device, a message according to a quantization parameter to generate a plaintext;

encrypting, by the first computing device, the plaintext according to a private key to generate a ciphertext;

sending, by the first computing device, the ciphertext to the second computing device, wherein a deep neural network model running on the second computing device is configured to perform an encrypted inference to generate a ciphertext result;

decrypting, by the first computing device, the ciphertext result according to the private key to generate a plaintext result; and decoding, by the first computing device, the plaintext result according to the quantization parameter to generate an inference result;

wherein sending, by the first computing device, the ciphertext to the deep neural network model to generate the ciphertext result comprises:

calculating an encrypted inner product result according to the ciphertext and a model weight;

reducing a first modulus of the encrypted inner product result to a second modulus to generate a modulus switch result; and inputting the modulus switch result into an activation function to generate the ciphertext result;

wherein inputting the modulus switch result into the activation function to generate the ciphertext result comprises:

calculating a first ratio of a message space size of the modulus switch result to the first modulus of the encrypted inner product result;

calculating a second ratio according to the first ratio, the message space size of the modulus switch result, and the quantization parameter; and executing a function evaluation algorithm according to the second ratio, a lookup table, and the modulus switch result to generate the ciphertext result.

2. The inference method for encrypted deep neural network model of claim 1, wherein before encoding the message according to the quantization parameter to generate the plaintext, further comprises:

encoding the message according to a default value of the quantization parameter to generate an encoding result;

calculating an inner product result according to the encoding result and a weight of the deep neural network model; and generating the quantization parameter according to a message space size of the plaintext and the inner product result.

3. The inference method for encrypted deep neural network model of claim 1, wherein calculating the encrypted inner product result according to the ciphertext and the model weight comprises:

calculating a plurality of scalar products according to a plurality of encrypted values contained in the ciphertext and a plurality of scalar values contained in the model weight; and performing a homomorphic encryption addition according to the plurality of scalar products to generate the encrypted inner product result.

4. The inference method for encrypted deep neural network model of claim 1, wherein the lookup table is configured to implement a rectified linear unit, and the second ratio is configured to set a slope of the rectified linear unit.

5. A conversion method for encrypted deep neural network model comprising:

inputting a training dataset into an integer model to extract a plurality of intermediate computation results from a plurality of layers;

adding a plurality of noise values to a plurality of outputs of the plurality of layers according to a numerical range of the plurality of intermediate computation results;

after the plurality of noise values is added to the plurality of outputs of the plurality of layers of the integer model, retraining the integer model with the training dataset to generate a floating-point fine-tuned model;

performing a model quantization according to the floating-point fine-tuned model to generate an integer fine-tuned model; and inputting the training dataset into the integer fine-tuned model to extract a plurality of quantization parameters, wherein the plurality of quantization parameters is configured to control a plurality of output values of a plurality of activation functions of the integer fine-tuned model.

6. The conversion method for encrypted deep neural network model of claim 5, further comprising:

training a teacher model according to the training dataset before inputting the training dataset into the integer model to extract the plurality of intermediate computation results from the plurality of layers;

performing a knowledge distillation according to the teacher model to generate a student model; and performing the model quantization according to the student model to generate the integer model before inputting the training dataset into the integer model to extract the plurality of intermediate computation results from the plurality of layers.

* * * * *